United States Patent
Chen (10) Patent No.: US 11,698,688 B2
(45) Date of Patent: Jul. 11, 2023

(54) POINTING DEVICE AND CONTROL METHOD THEREOF

(71) Applicant: Chicony Electronics Co., Ltd., New Taipei (TW)

(72) Inventor: Chien-Tsung Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/446,716

(22) Filed: Sep. 1, 2021

(65) Prior Publication Data

US 2022/0206595 A1 Jun. 30, 2022

(30) Foreign Application Priority Data

Dec. 31, 2020 (TW) ................................ 109147212

(51) Int. Cl.
*G06F 3/03* (2006.01)
*G06F 3/0346* (2013.01)
*G06F 3/038* (2013.01)

(52) U.S. Cl.
CPC .......... *G06F 3/0346* (2013.01); *G06F 3/0383* (2013.01)

(58) Field of Classification Search
CPC ...... G06F 3/0346; G06F 3/0383; G06F 3/011; G06F 3/01; G06F 3/00; G01S 5/0294; G01S 5/18; G01S 5/16; G01S 5/30; G01S 11/16; G01C 21/165
See application file for complete search history.

(56) References Cited

U.S. PATENT DOCUMENTS

| | | | |
|---|---|---|---|
| 6,437,798 B1 * | 8/2002 | Aoki | G06T 15/10 345/474 |
| 7,239,301 B2 | 7/2007 | Liberty et al. | |
| 9,030,405 B2 | 5/2015 | Nasiri et al. | |
| 2007/0299626 A1 * | 12/2007 | Song | G01C 21/16 701/532 |
| 2010/0156785 A1 * | 6/2010 | Nakaoka | G06F 3/0346 345/157 |

(Continued)

FOREIGN PATENT DOCUMENTS

| | | |
|---|---|---|
| CN | 106933390 A | 7/2017 |
| CN | 108534744 A | 9/2018 |

(Continued)

*Primary Examiner* — Lunyi Lao
*Assistant Examiner* — Jarurat Suteerawongsa
(74) *Attorney, Agent, or Firm* — CKC & Partners Co., LLC (57) ABSTRACT

A pointing device includes an acceleration sensor, a motion sensor and a processor. The processor includes a first attitude angle calculator, a second attitude angle calculator and an attitude angle selector. When a predetermined condition is satisfied, the processor control the acceleration sensor to generate acceleration data, the first attitude angle calculator calculates a first attitude angle output according to the acceleration data, and the attitude angle selector receives the first attitude angle output as the reference data. When the predetermined condition is not satisfied, the second attitude angle calculator calculates a second attitude angle output according to angular velocity data generated by the motion sensor and the reference data, and the attitude angle selector receives the second attitude angle output as the reference data. The present disclosure also provides a control method of the pointing device.

14 Claims, 11 Drawing Sheets

(56) References Cited

U.S. PATENT DOCUMENTS

2013/0038529 A1\* 2/2013 Hwang ................. G06F 3/0346
345/157
2017/0199585 A1\* 7/2017 Grenet .................. G06F 3/0346

FOREIGN PATENT DOCUMENTS

| JP | 5363533 B2 | 12/2013 |
|---|---|---|
| TW | 201035581 A | 10/2010 |
| TW | I376520 B | 11/2012 |
| TW | I525481 B | 3/2016 |

\* cited by examiner

POINTING DEVICE AND CONTROL METHOD THEREOF

CROSS-REFERENCE TO RELATED APPLICATION

This application claims priority to Taiwan Application Serial Number 109147212, filed Dec. 31, 2020, which is herein incorporated by reference in its entirety.

BACKGROUND

Field of Invention

This disclosure relates to the pointing device and control method thereof, and in particular to the pointing device having the acceleration sensor and the motion sensor and control method thereof.

Description of Related Art

The conventional pointing device usually utilizes the acceleration sensor and the motion sensor to collect data and solves the attitude of the point device by complicated algorithm. For generating the stable output, each set of the output data is almost generated through the calculation of filter, compensation or fusion. However, since the calculation is over heavy, the conventional pointing device often faces the problem of long reaction time, high cost (because the high-efficiency processor is utilized) or over power consumption.

Figure 1A:
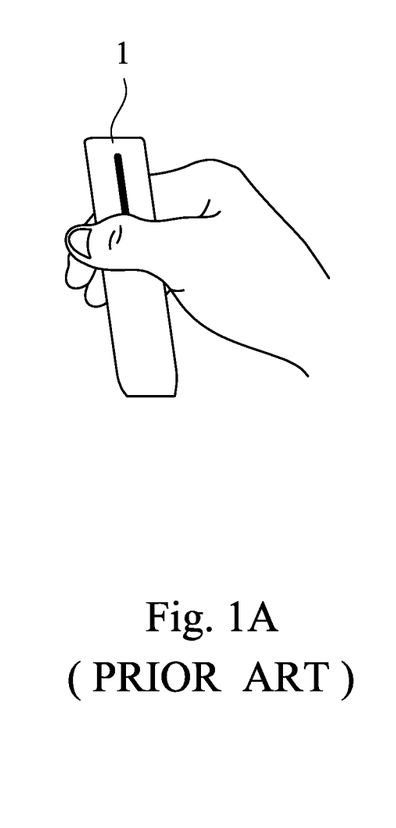
FIGS. 1A-1B are schematic diagrams of the utilization of the pointing device which is a flat cuboid.
Figure 1B:
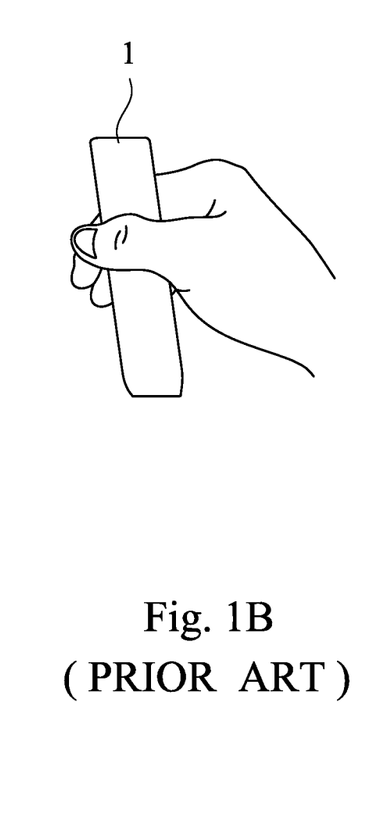

In addition, referring to FIGS. 1A-1B, the conventional pointing device 1 is usually a flat cuboid. There are only two ways to hold the conventional pointing device 1. One is formal grip (as shown in FIG. 1A), and the other one is reverse grip (as shown in FIG. 1B). When the user holds the pointing device 1 in the way of reverse grip, the correct pointing of the pointing device can be generally obtained by simply reversing coordinate.

SUMMARY

An aspect of present disclosure relates to a pointing device. The pointing device includes an acceleration sensor, a motion sensor and a processor. The acceleration sensor is configured to generate acceleration data according to the motion state of the pointing device. The motion sensor is configured to generate angular velocity data according to the motion state of the pointing device. The processor is coupled to the acceleration sensor and the motion sensor and includes a first attitude angle calculator, a second attitude angle calculator, an attitude angle selector and an attitude angle convertor. When a predetermined condition is satisfied, the processor control the acceleration sensor to generate the acceleration data, the first attitude angle calculator calculates a first attitude angle output according to the acceleration data, and the attitude angle selector receives the first attitude angle output as the reference data, so as to generate the output data. When the predetermined condition is not satisfied, the second attitude angle calculator calculates a second attitude angle output according to the angular velocity data and the reference data, and the attitude angle selector receives the second attitude angle output as the reference data, so as to generate the output data. The attitude angle convertor is configured to convert the output data into displacement data of a reference coordinate system.

Another aspect of present disclosure relates to a control method. The control method includes: generating angular velocity data according to the motion state of the pointing device; calculating a second attitude angle output according to the angular velocity data and the reference data; based on whether a predetermined condition is satisfied, calculating a first attitude angle output as the reference data according to acceleration data or receiving the second attitude angle output as the reference data, so as to generate the output data; and converting the output data into displacement data of a reference coordinate system.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 2A:
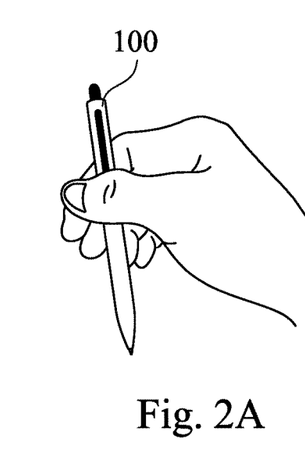
FIGS. 2A-2F are schematic diagrams of the utilization of the pointing device which is a cylinder.
Figure 2B:
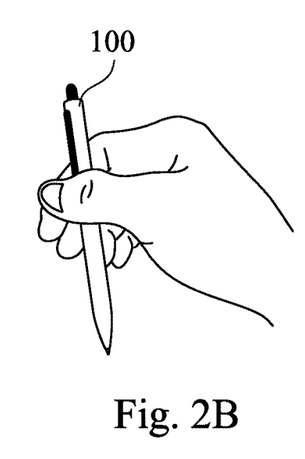
Figure 2C:
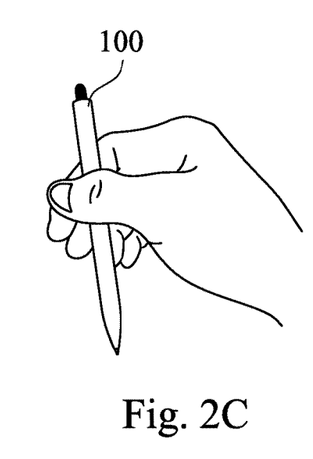
Figure 2D:
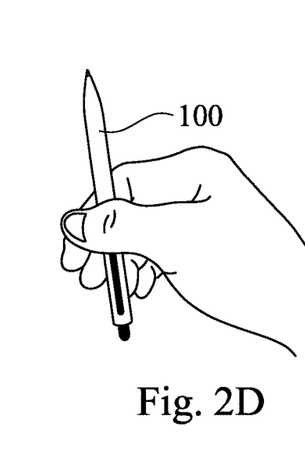
Figure 2E:
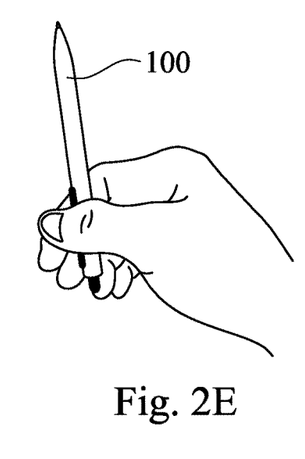
Figure 2F:
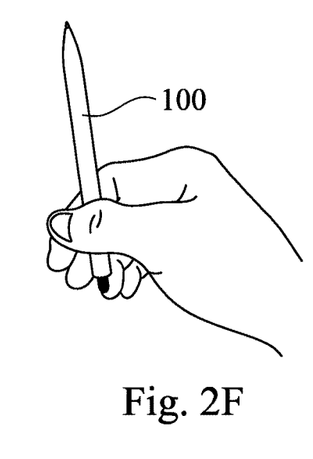

Referring to FIGS. 2A-2F, FIGS. 2A-2F illustrates the utilization of the pointing device which has a cylinder shape (e.g. stylus, presentation pen). Since the cylinder is easily to roll, the cylindrical pointing device can usually be held in a variety of ways (for example, three ways of formal grip as shown in FIGS. 2A-2C, three ways of reverse grip as shown in FIGS. 2D-2F), so that the correct attitude of the pointing device cannot be obtained by simple algorithm (for example, reversing coordinate). In addition, even though the pointing device utilizes the common algorithm (for example, the calculation of filter, compensation or fusion), the pointing device still requires performing many calculations such that the correct attitude of the pointing device is obtained. Therefore, the cylindrical pointing device still faces the problem of time consuming, high cost or over power consumption due to the heavy calculation.

Figure 3:
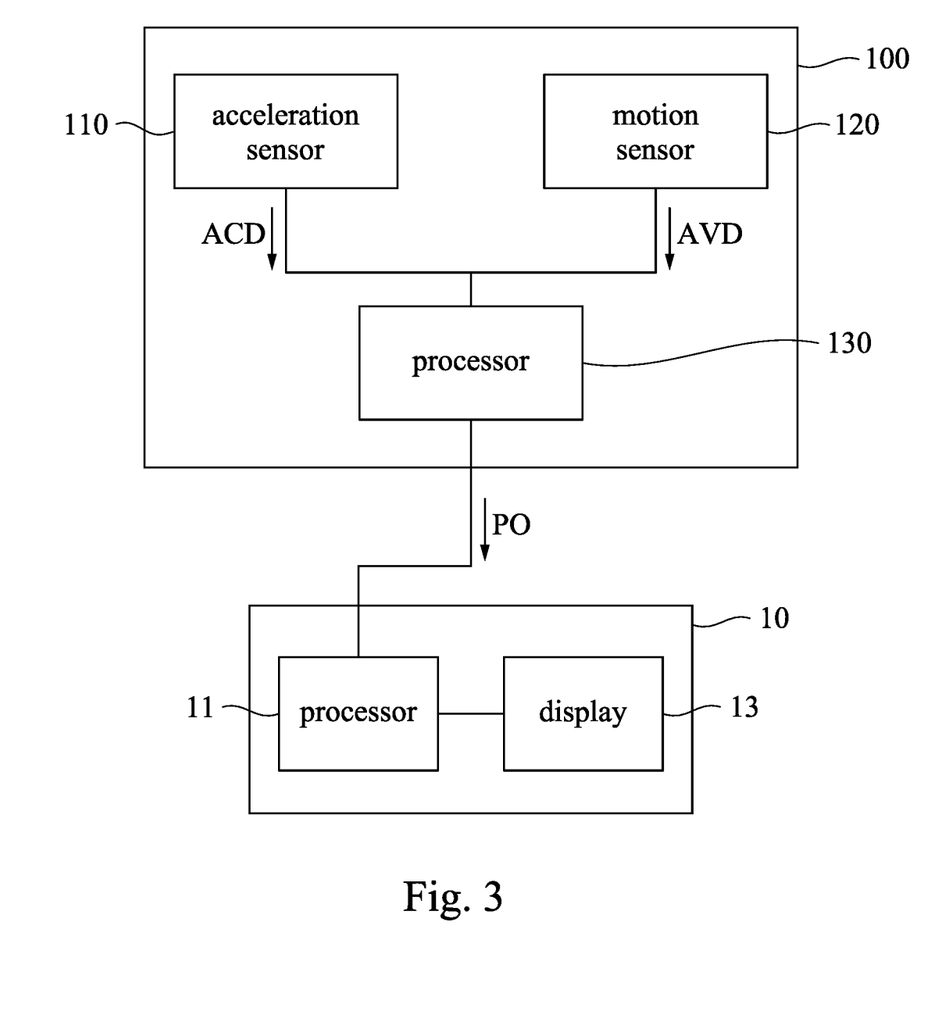
FIG. 3 is a block diagram of the pointing device in accordance with some embodiments of the present disclosure.

Accordingly, the present disclosure provides a pointing device which is capable of reducing calculation burden. Referring to FIG. 3, FIG. 3 illustrates a pointing device 100 in accordance with an embodiment of the present disclosure. In some embodiments, the pointing device 100 is a stylus, a presentation pen, a game controller, a media remoter or other objects that allows the user to operate.

In particular, the pointing device 100 includes an acceleration sensor 110, a motion sensor 120 and a processor 130. The acceleration sensor 110 and the motion sensor 120 are respectively configured to generate acceleration data ACD and angular velocity data AVD according to the motion state of the pointing device 100. The processor 130 is coupled to the acceleration sensor 110 and the motion sensor 120, so as to generate displacement data PO on a reference coordinate system (not shown).

As shown in FIG. 3, the processor 130 can further output the displacement data PO to an external device 10 by a communication module (not shown). The displacement data PO can be received by a processor 11 of the external device 10. Accordingly, the processor 11 can control the movement of an indicating object (not shown) displayed on the screen of a display 13 of the external device 10 according to the displacement data PO. In some embodiments, the indicating object is a cursor.

In some embodiments, the reference coordinate system is a coordinate system on the screen of the display 13. In particular, the reference coordinate system is defined by a reference original point, a first axis and a second axis. The reference original point is positioned at the left-lifted corner of the screen. The first axis extends along a first direction from the reference original point, and the second axis extends along a second direction perpendicular to the first direction from the reference original point. In other words, the first axis is perpendicular to the second axis. In addition, a third axis perpendicular to the screen is also perpendicular to both the first axis and the second axis. In some embodiments, the displacement data PO includes a displacement on the first axis and a displacement on the second axis.

Figure 4:
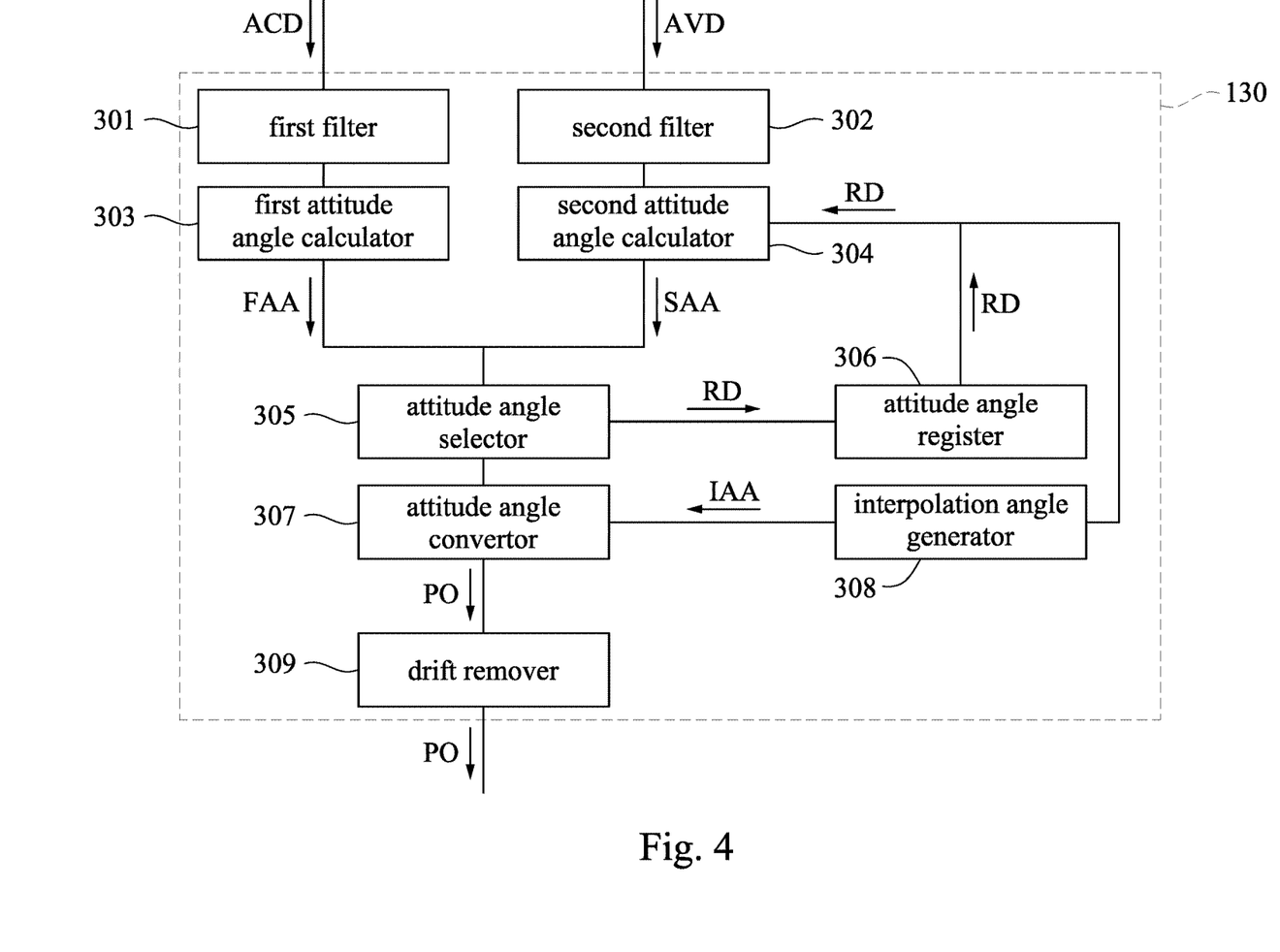
FIG. 4 is a block diagram of the processor of the pointing device in accordance with some embodiments of the present disclosure.

Referring to FIG. 4, the processor 130 includes a first filter 301, a second filter 302, a first attitude angle calculator 303, a second attitude angle calculator 304, an attitude angle selector 305, an attitude angle register 306, an attitude angle convertor 307, an interpolation angle generator 308 and a drift remover 309.

In structure, the first filter 301 is coupled to the acceleration sensor 110, and the second filter 302 is coupled to the motion sensor 120. The first attitude angle calculator 303 is coupled to the first filter 301, and the second attitude angle calculator 304 is coupled to the second filter 302. The attitude angle selector 305 is coupled to the first attitude angle calculator 303 and the second attitude angle calculator 304. The attitude angle register 306 is coupled to the attitude angle selector 305 and the second attitude angle calculator 304. The interpolation angle generator 308 is coupled to the second attitude angle calculator 304 and the attitude angle register 306. The attitude angle convertor 307 is coupled to the attitude angle selector 305 and the interpolation angle generator 308. The drift remover 309 is coupled to the attitude angle register 307.

In some embodiments, the acceleration sensor 110 is, for example, an accelerometer. The motion sensor 120 is, for example, a gyro. The first filter 301 is a low-pass filter, an infinite impulse response filter or a moving average filter. The second filter 302 is a high-pass filter, a finite impulse response filter or a moving average filter.

In some embodiments, the first filter 301, the second filter 302, the first attitude angle calculator 303, the second attitude angle calculator 304, the attitude angle selector 305, the attitude angle register 306, the attitude angle convertor 307, the interpolation angle generator 308 and the drift remover 309 are integrated together in the suitable way.

Figure 5:
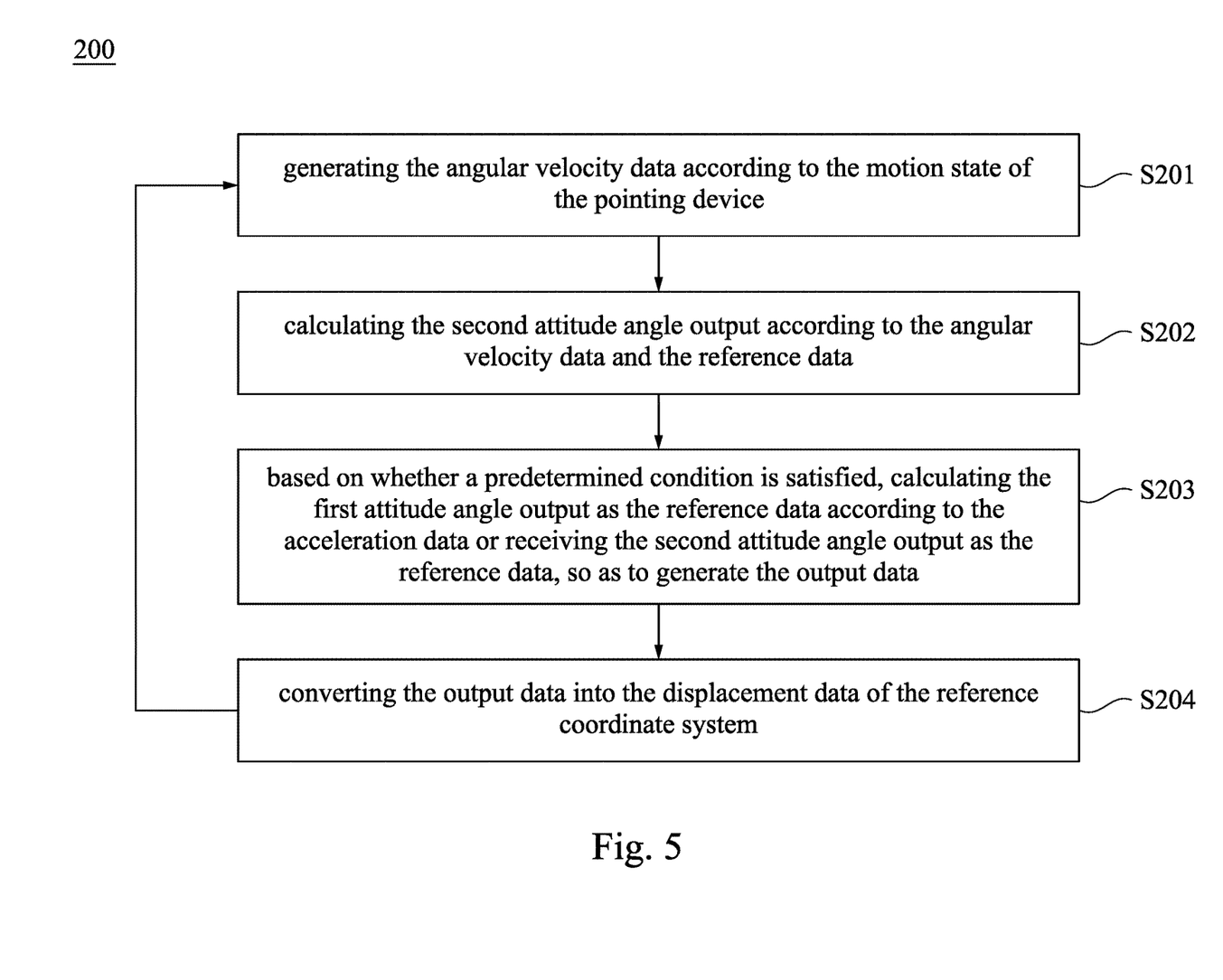
FIG. 5 is a flow diagram of the control method of the pointing device in accordance with some embodiments of the present disclosure.

Referring to FIG. 5, FIG. 5 illustrates a control method 200 in accordance with an embodiment of the present disclosure. The pointing device 100 can perform relational operations according to the control method 200, so as to generate the displacement data PO. As shown in FIG. 5, the control method 200 includes the operations S201-S204. For better understanding the present application, the operation of the pointing device 100 would be described in the following paragraphs with reference made to FIGS. 3-4.

In the operation S201, the motion sensor 120 generates the angular velocity data AVD according to the motion state of the pointing device 100. In particular, when the pointing device 100 is rotated and/or moved in a three-dimensional space, the angular velocity data AVD generated by the motion sensor 120 includes an angular velocity value. In the present embodiment, the acceleration sensor 110 is not activated or operated in the operation S201 (in other words, the angular velocity data AVD is generated only). In other embodiments, the acceleration sensor 110 and the motion sensor 120 generate the acceleration data ACD and the angular velocity data AVD according to the motion state of the pointing device 100 simultaneously. The acceleration data ACD generated by the acceleration sensor 110 includes a gravitational acceleration value.

In the operation S202, the processor 130 calculates the second attitude angle output SAA according to the angular velocity data AVD and reference data RD. In some embodiments, as shown in FIG. 4, the second filter 302 of the processor 130 filters the angular velocity data AVD first to reduce the noise. Then, the second attitude angle calculator 304 of the processor 130 calculates the second attitude angle output SAA according to the filtered angular velocity data AVD and the reference data RD. For example, the second attitude angle calculator 304 performs the integration for the angular velocity value included by the angular velocity data AVD based on the reference data RD (would be described later), such that the rotational angles (including the pitch angle, the roll angle and the yaw angle) of the pointing device 100 on three axes of the three-dimensional space during a period can be calculated. It can be seen that the second attitude angle output SAA is the relative information in relation to the attitude of the pointing device 100.

In the operation S203, based on whether a predetermined condition is satisfied, the processor 130 calculates a first attitude angle output FAA as the reference data RD according to the acceleration data ACD or receives the second attitude angle output SAA (which can be calculated in the operation S202) as the reference data RD, so as to generate output data. It is worth noting that the processor 130 usually receives the second attitude angle output SAA as the reference data RD through the attitude angle selector 305. However, since the second attitude angle output SAA would accumulate error as the time goes on to raise the drift problem, the processor 130 would calculate the first attitude angle output FAA as the reference data RD in a few conditions, so as to eliminate the accumulated error of the second attitude angle output SAA. Accordingly, when the first attitude angle output FAA is required, the processor 130 would activate or operate the acceleration sensor 110 through the attitude angle selector 305, so as to generate the acceleration data ACD. The processor 130 then receives and processes the acceleration data ACD, thereby reducing the calculation burden. In other words, the processor 130 does not process the acceleration data ACD and the angular velocity data AVD simultaneously.

In particular, when the first attitude angle output FAA is required, the first filter 301 of the processor 130 filters the acceleration data ACD first, so as to reduce the noise. The first attitude angle calculator 303 of the processor 130 calculates the first attitude angle output FAA according to the filtered acceleration data ACD. For example, the first attitude angle calculator 303 performs the orthogonal decomposition for the gravitational acceleration value included by the acceleration data ACD and further calculates the inclined angle (including the pitch angle, the roll angle and the yaw angle) of the pointing device 100 on three axes of the three-dimensional space. It can be seen that the first attitude angle output FAA is the absolute information in relation to the attitude of the pointing device 100. Then, the processor 130 receives the first attitude angle output FAA as the reference data RD through the attitude angle selector 305.

In some embodiments, the motion sensor 120 is the motion sensor for at least two axes of the three-dimensional space, and the second attitude angle output SAA includes values in relation to the rotational angle of the pointing device 100 on at least two axes of the three-dimensional space. In some embodiments, the acceleration sensor 110 is the acceleration sensor for at least two axes of the three-dimensional space, and the first attitude angle output FAA includes values in relation to the acceleration of the pointing device 100 on the at least two axes of the three-dimensional space.

In other embodiments, since the acceleration sensor 110 and the motion sensor 120 generate the data with lower noise due to the improved manufacturing process, the first filter 301 and/or the second filter 302 of the processor 130 can be omitted. In other words, the first attitude angle calculator 303 of the processor 130 can receive the acceleration data ACD directly, so as to calculate the first attitude angle output FAA. The second attitude angle calculator 304 of the processor 130 can receive the angular velocity data AVD directly, so as to calculate the second attitude angle output SAA.

In some embodiments, the predetermined condition in the operation S203 includes that the attitude angle selector 305 has never received the first attitude angle output FAA or the second attitude angle output SAA. In particular, as the pointing device 100 is just turned on or activated, the attitude angle selector 305 has never received the first attitude angle output FAA or the second attitude angle output SAA (at this time, the reference data RD is unknown). The processor 130 calculates the $1^{st}$ set of the first attitude angle output FAA according to the acceleration data ACD by the first filter 301 and the first attitude angle calculator 303. Also, the processor 130 controls the attitude angle selector 305 to receive the $1^{st}$ set of the first attitude angle output FAA as the $1^{st}$ set of the reference data RD. As shown in FIG. 4, the reference data RD is outputted to the attitude angle register 306, and the second attitude angle calculator 304 can obtain the reference data RD from the attitude angle register 306. In such way, the second attitude angle calculator 304 can calculate the $1^{st}$ set of the second attitude angle output SAA according to the angular velocity data AVD and the $1^{st}$ set of the first attitude angle output FAA, and the second attitude angle output SAA can be used as the output data.

Figure 6A:
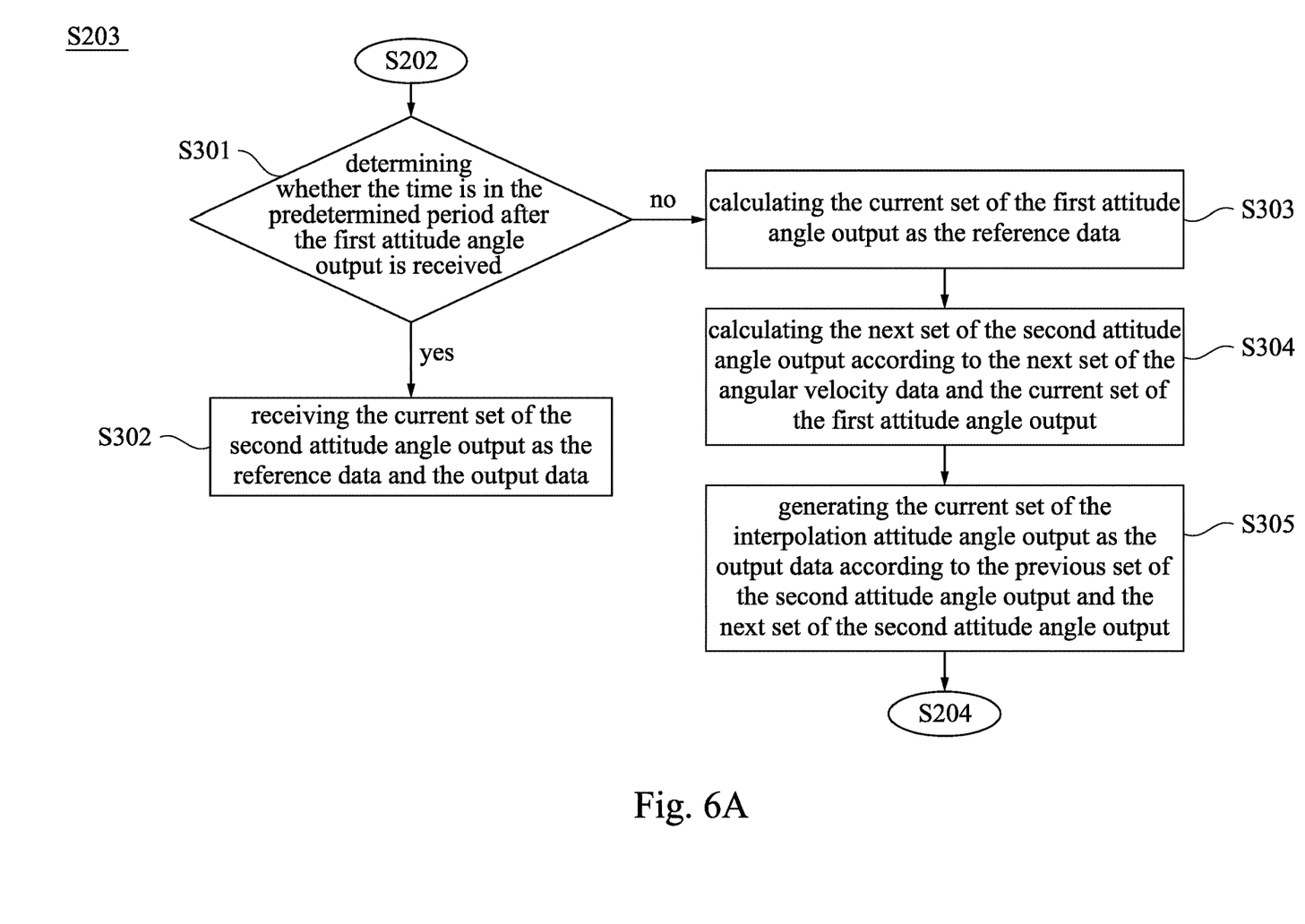
FIG. 6A is a flow diagram of one operation of the control method of the pointing device in accordance with some embodiments of the present disclosure.
Figure 6B:
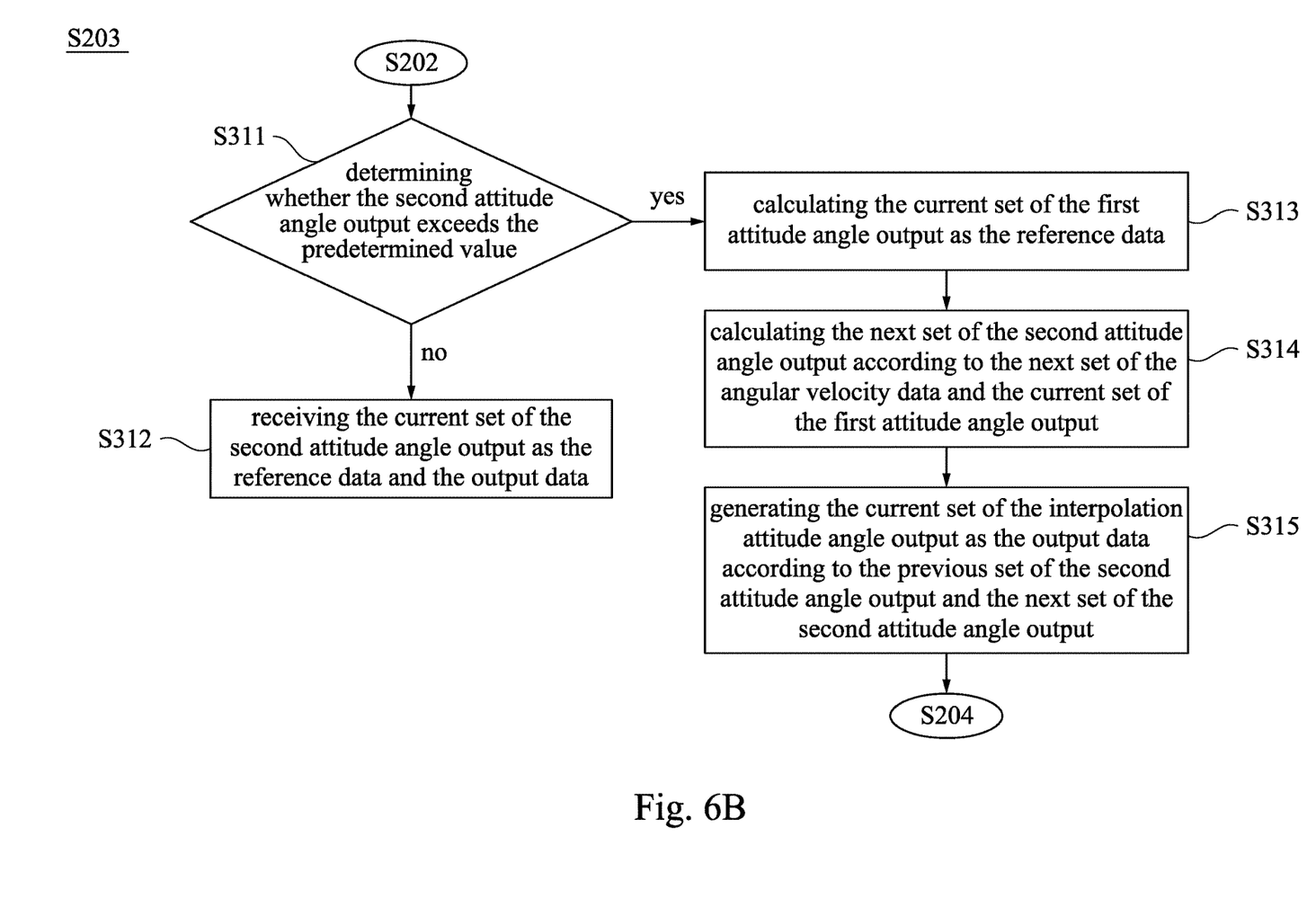
FIG. 6B is a flow diagram of one operation of the control method of the pointing device in accordance with other embodiments of the present disclosure.

Referring to FIG. 6A, in some embodiments, the operation S203 includes the sub-operations S301-S305. In the sub-operation S301, after the attitude angle selector 305 receives the first attitude angle output FAA or the second attitude angle output SAA, the processor 130 determines whether the time is in a predetermined period after the attitude angle selector 305 receives the first attitude angle output FAA as the reference data RD by, for example, the attitude angle selector 305, so as to determine to calculate the first attitude angle output FAA or to receive the second attitude angle output SAA.

In particular, the predetermined period can be, for example but not limited to, 0.3 second. When the elapsed time after one set of the first attitude angle output FAA is received is less than 0.3 second, the sub-operation S302 is performed. In the sub-operation S302, the processor 130 receives the second attitude angle output SAA as the reference data RD and as the output data by the attitude angle selector 305.

When the elapsed time after one set of the first attitude angle output FAA is received is equal to or more than 0.3 second, the sub-operations S303-S305 are performed. For better understanding the present application, the sub-operations S303-S305 would be described in the following paragraphs with reference made to FIG. 7. In the sub-operation S303, the processor 130 receives the acceleration data ACD to calculate the current set of the first attitude angle output FAA[N+1] as the reference data RD, where N is the integer greater than 1. Therefore, the current set of the second attitude angle output SAA[N+1] is not existed in FIG. 7. Accordingly, the processor 130 is not required to receive the current set of the angular velocity data AVD and does not process the current set of the angular velocity data AVD to generate the second attitude angle output SAA[N+1]. As shown in FIG. 4 again, the reference data RD is outputted to the attitude angle register 306, and the second attitude angle calculator 304 obtains the reference data RD from the attitude angle register 306. In the sub-operation S304, the second attitude angle calculator 304 calculates the next set of the second attitude angle output SAA[N+2] according to the next set of the angular velocity data AVD and the current set of the first attitude angle output FAA[N+1]. In the sub-operation S305, the interpolation angle generator 308 generates the current set of the interpolation attitude angle output IAA[N+1] as the output data according to the previous set of the second attitude angle output SAA[N] and the next set of the second attitude angle output SAA[N+2].

In some embodiments, the interpolation angle generator 308 generates the interpolation attitude angle output IAA by utilizing the technology of linear interpolation or spherical linear interpolation. It is understood that the interpolation angle generator 308 can obtain the previous set of the second attitude angle output SAA[N] from the attitude angle register 306 and can obtain the next set of the second attitude angle output SAA[N+2] from the second attitude angle calculator 304.

Referring to FIG. 6A, in other embodiments, the operation S203 includes the sub-operations S311-S315. In the sub-operation S311, after the attitude angle selector 305 receives the first attitude angle output FAA or the second attitude angle output SAA, the processor 130 determines whether the second attitude angle output SAA exceeds a predetermined value by, for example, the attitude angle selector 305, so as to determine to calculate the first attitude angle output FAA or to receive the second attitude angle output SAA.

In particular, the predetermined value can be, for example but not limited to, 10 degrees. When at least one of the pitch angle, the roll angle and the yaw angle included by the second attitude angle output SAA is smaller than or equal to 10 degrees, the sub-operation S312 is performed. When at least one of the pitch angle, the roll angle and the yaw angle included by the second attitude angle output SAA is greater than 10 degrees, the sub-operations S313-S315 are performed. The descriptions of the sub-operations S312-S315 are similar or same as those of the sub-operations S302-S305, thereby being omitted herein.

Following the above descriptions, the output data can be the second attitude angle output SAA or the interpolation attitude angle output IAA. As shown in FIG. 5A again, after the output data is generated, the operation S204 is performed. In the operation S204, the attitude angle convertor 307 converts the output data into the displacement data PO of the reference coordinate system. In particular, the attitude angle convertor 307 multiplies the yaw angle and the pitch angle of the output data by a predetermined parameter to generate the displacement on the first axis of the reference coordinate system and the displacement on the second axis of the reference coordinate system (that is, the displacement data PO). For example, the pitch angle is 4 degrees, the yaw angle is 12 degrees, and the predetermined parameter is 16. After the conversion, the displacement on the first axis is 192 points (1 point is 1 unit of the displacement), and the displacement on the second axis is 64 points.

It is worth noting that the predetermined parameter can be set according to the screen size of the display 13. In some embodiments, the bigger the screen size of the display 13, the greater the predetermined parameter, or the smaller the screen size of the display 13, the smaller the predetermined parameter. In such way, the movement trace of the indicating object on the screen can be synchronized with the motion state of the pointing device 100. The problem that the movement trace of the indicating object is short while the rotational angle of the pointing device 100 is big would not be generated.

By performing the operations S201-S204 repeatedly, the pointing device 100 can continuously output the corresponding displacement data PO to the external device 10 while moving, so that the indicating object displayed by the display 13 would have the movement trace corresponding to the motion state of the pointing device 100.

In the above embodiments, the pointing device 100 generates the displacement data to the external device 10 according to the pitch angle and the yaw angle only. In other embodiments, the pointing device 100 can generate an action data (not shown) to the external device 10 according to the roll angle included by the output data, so that the indicating object can perform specific action. For example, when the pointing device 100 is counterclockwise rotated around the third axis perpendicular to the screen such that the roll angle is negative, the processor 130 generates the action data according to the negative roll angle and outputs the action data to the external device 10, so that the button on the user interface or the icon of the application displayed by the display 13 is clicked by the indicating object according to the action data.

As above description, the processor 130 of the pointing device 100 eliminates the accumulated error of the second attitude angle output SAA by receiving the acceleration data ACD and calculating the first attitude angle output FAA appropriately. However, in some embodiments, the yaw angle included by the first attitude angle output FAA should be abandoned (cannot be used to calculate) since the acceleration sensor 110 cannot sense the horizontal rotation. Therefore, the accumulated error of the yaw angle included by the second attitude angle output SAA cannot be corrected through the first attitude angle output FAA. Referring to FIG. 4 again, for solving the problem that the accumulated error of the yaw angle cannot be corrected, the drift remover 309 of the processor 130 receives the displacement data PO, compares the displacement on the first axis included by the displacement data PO (which is converted from the yaw angle included by the second attitude angle output SAA) with a threshold value and selectively process the displacement data PO according to the comparison result. In particular, the threshold value can be, for example but not limited to, ⅓ points. When the displacement on the first axis of the current set of the displacement data PO is smaller than ⅓ points, the drift remover 309 determines that the displacement on the first axis is generated because of the error and stops to output the current set of the displacement data PO (or substitutes the current set of the displacement data PO with the previous set of the displacement data PO). When the displacement on the first axis of the current set of the displacement data PO is not smaller than ⅓ points, the drift remover 309 continues to output the current set of the displacement data PO. In other words, the drift remover 309 selectively outputs the displacement data PO based on whether the displacement on the first axis is greater than the threshold value.

In other embodiments, the drift remover 309 would compare the displacement on the first axis and the displacement on the second axis (which is converted from the pitch angle included by the second attitude angle output SAA) included by the displacement data PO with the threshold value respectively.

Figure 8:
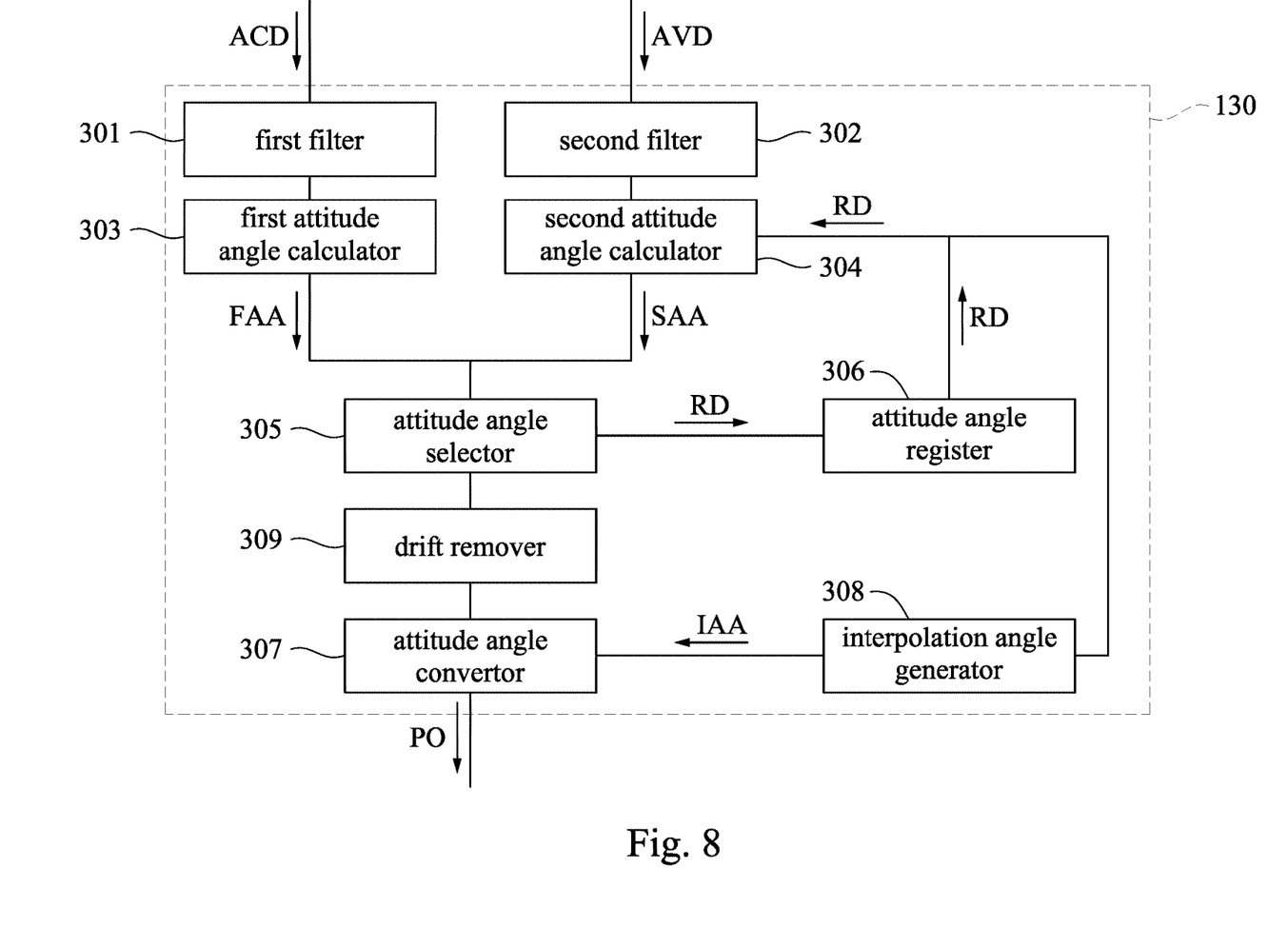
FIG. 8 is a block diagram of the pointing device in accordance with other embodiments of the present disclosure.

In other embodiments, referring to FIG. 8, the drift remover 309 is coupled between the attitude angle selector 305 and the attitude angle convertor 307. The drift remover 309 receives the second attitude angle output SAA (which is outputted from the attitude angle selector 305), compares at least one of the pitch angle, the roll angle and the yaw angle included by the second attitude angle output SAA with another threshold value (e.g. 0.1 degrees) and selectively output the second attitude angle output SAA to the attitude angle convertor 307 according to the comparison result. In particular, when at least one of the pitch angle, the roll angle and the yaw angle included by the current set of the second attitude angle output SAA is smaller than the another threshold value, the drift remover 309 would not output the current set of the second attitude angle output SAA to the attitude angle convertor 307 (or the drift remover 309 outputs the previous set of the second attitude angle output SAA to substitute the current set of the second attitude angle output SAA). When at least one of the pitch angle, the roll angle and the yaw angle included by the current set of the second attitude angle output SAA is not smaller than the another threshold value, the operation is performed as the above descriptions, such that the current set of the second attitude angle output SAA is continued to be output to the attitude angle convertor 307.

Figure 9:
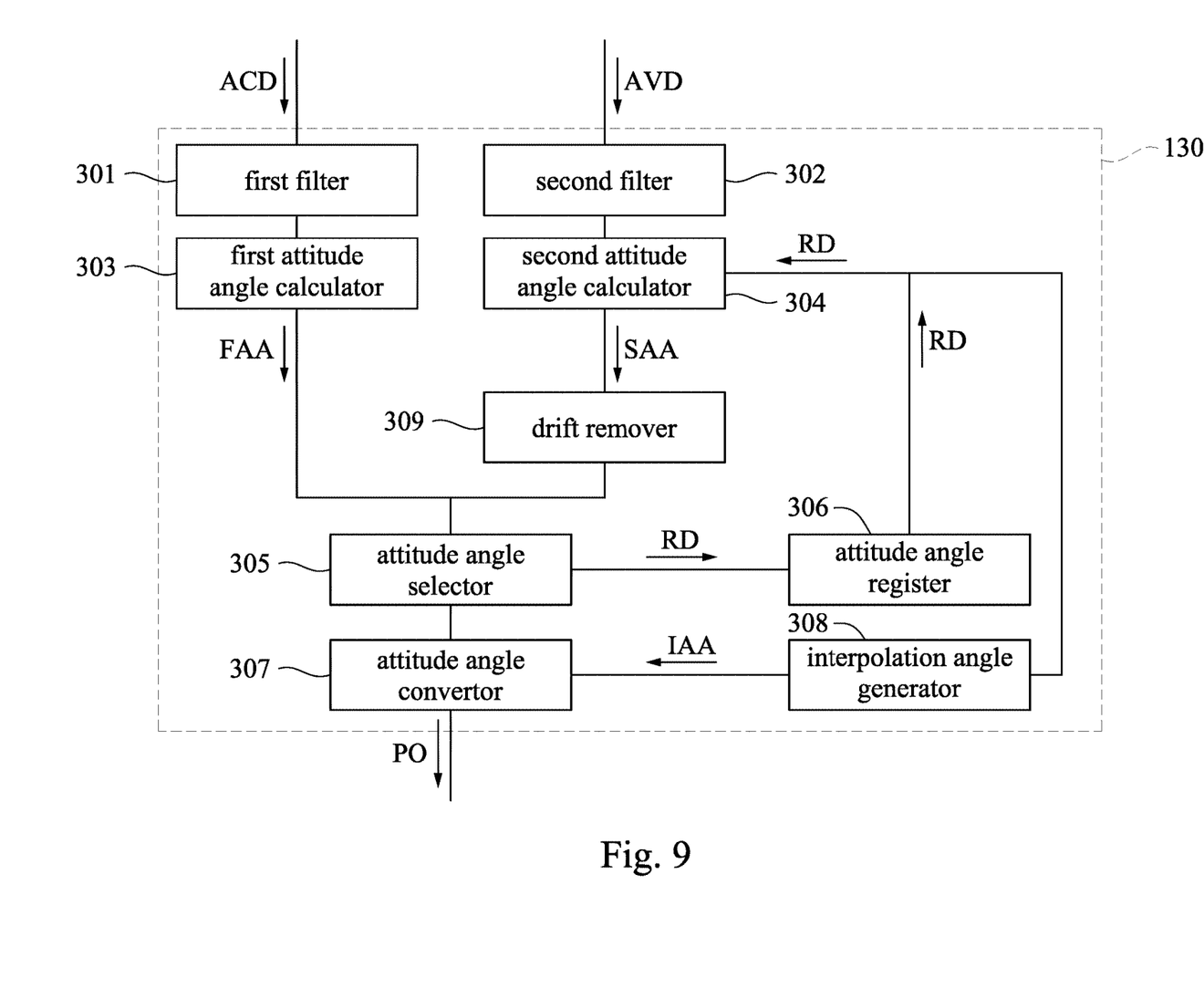
FIG. 9 is a block diagram of the pointing device in accordance with other embodiments of the present disclosure.

In other embodiments, referring to FIG. 9, the drift remover 309 is coupled between the second attitude angle calculator 304 and the attitude angle selector 305. The drift remover 309 receives the second attitude angle output SAA (which is outputted from the second attitude angle calculator 304), compares at least one of the pitch angle, the roll angle and the yaw angle included by the second attitude angle output SAA with another threshold value (e.g. 0.1 degrees) and selectively output the second attitude angle output SAA to the attitude angle selector 305 according to the comparison result. In particular, when at least one of the pitch angle, the roll angle and the yaw angle included by the current set of the second attitude angle output SAA is smaller than the another threshold value, the drift remover 309 would not output the current set of the second attitude angle output SAA to the attitude angle selector 305 (or the drift remover 309 outputs the previous set of the second attitude angle output SAA to substitute the current set of the second attitude angle output SAA). When at least one of the pitch angle, the roll angle and the yaw angle included by the current set of the second attitude angle output SAA is not smaller than the another threshold value, the operation is performed as the above descriptions, such that the current set of the second attitude angle output SAA is continued to be output to the attitude angle selector 305.

Figure 7:
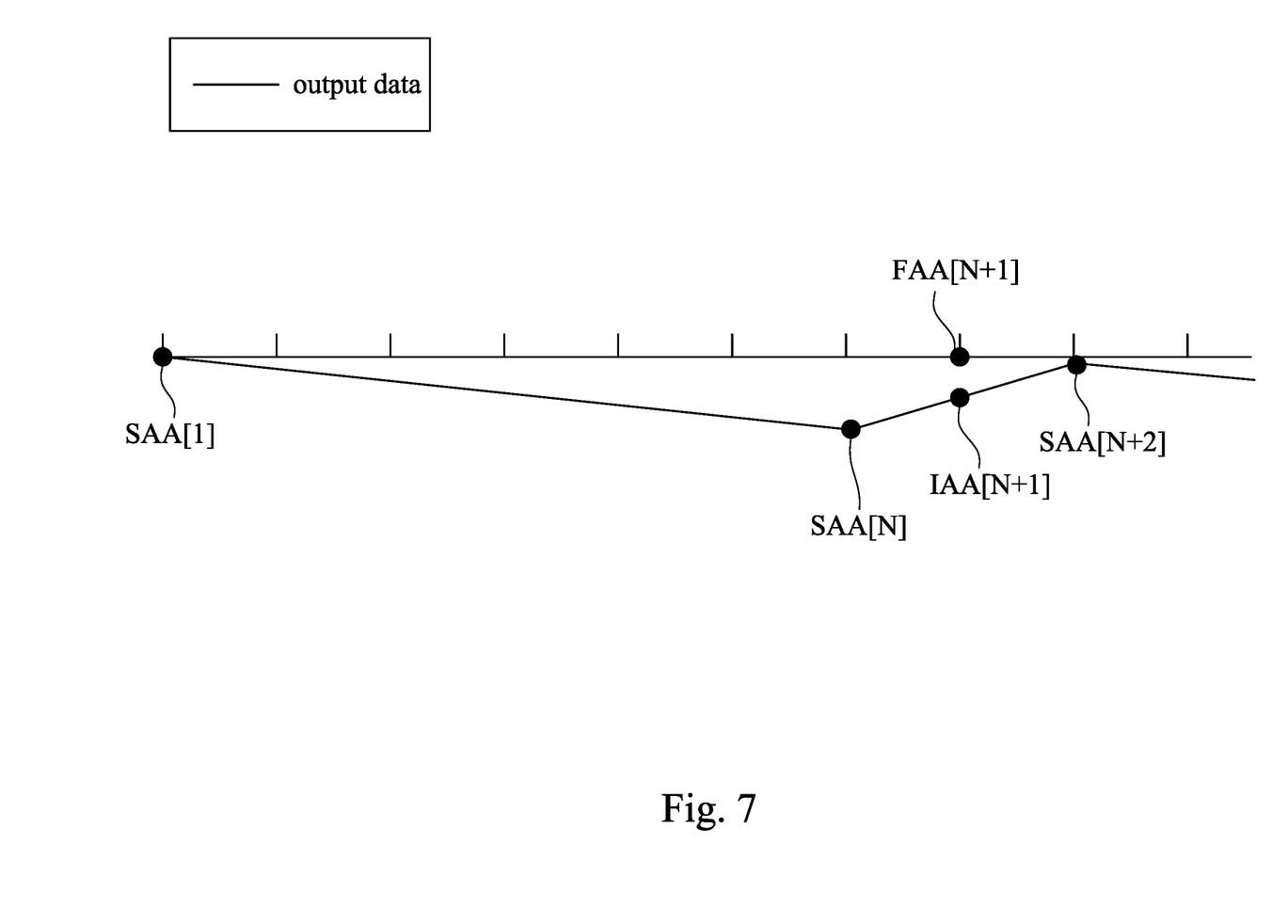
FIG. 7 is a timing diagram of the output data of the pointing device in accordance with some embodiments of the present disclosure.
Figure 10:
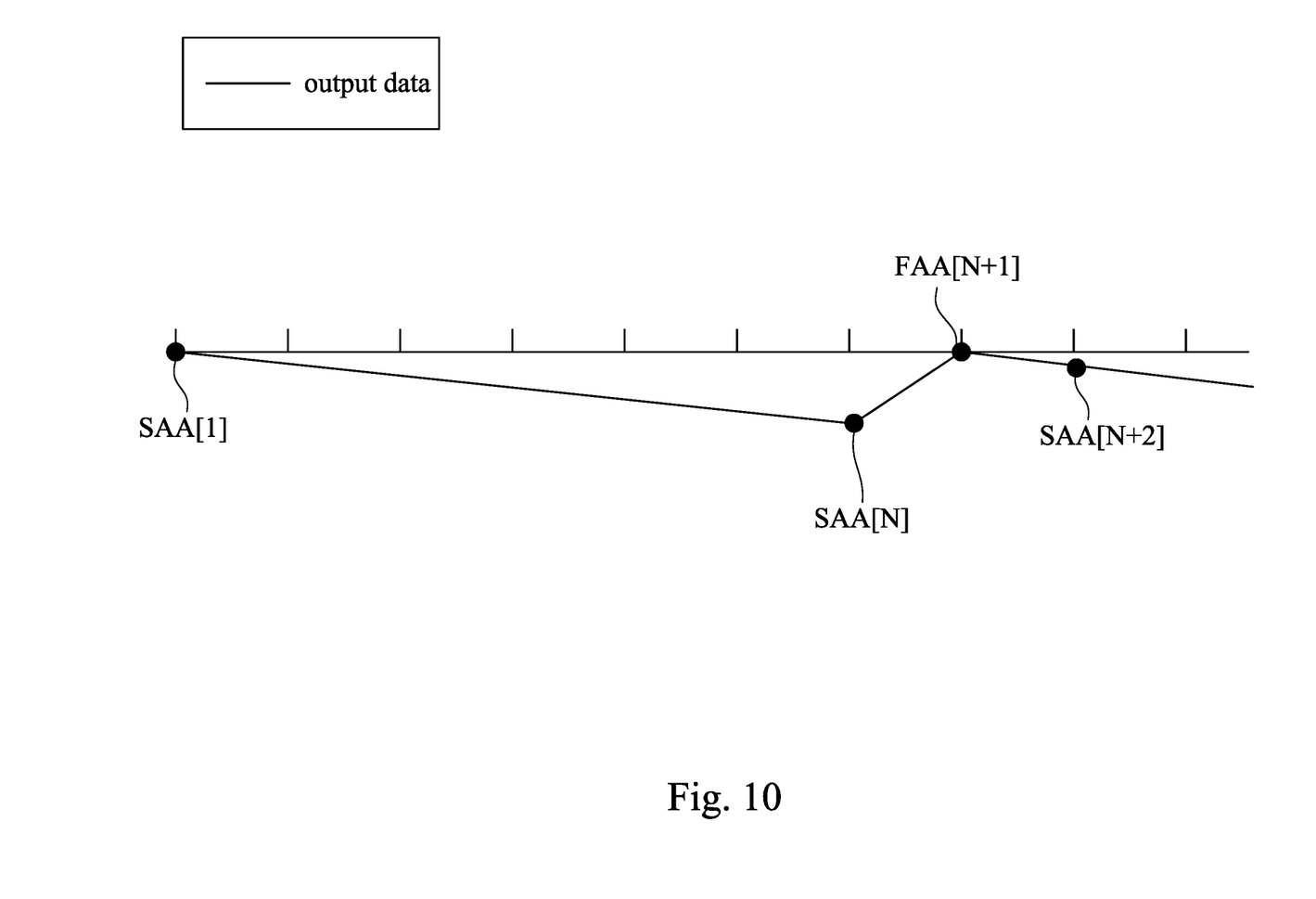
FIG. 10 is a timing diagram of the output data of the pointing device in accordance with other embodiments of the present disclosure.

In other embodiments, the interpolation angle generator 308 and the drift remover 309 of the processor 130 can be omitted. Referring to FIG. 10, in such arrangement, when the attitude angle selector 305 receives the current set of the first attitude angle output FAA[N+1] according to the predetermined condition, the current set of the first attitude angle output FAA[N+1] is used as the reference data RD for generating the next set of the second attitude angle output SAA[N+2]. Meanwhile, the current set of the first attitude angle output FAA[N+1] is used as the output data, so as to be outputted to the attitude angle convertor 307. Comparing with the embodiment which uses the first attitude angle output FAA[N+1] as the output data, the embodiment which uses the interpolation attitude angle output IAA[N+1] as the output data (as shown in FIG. 7) can further modify the movement trace of the indicating object, such that the movement trace can be smoother.

In the above embodiments, the pointing device 100 only generates single set of the interpolation attitude angle output IAA[N+1] to perform the interpolation between two sets of the second attitude angle output SAA[N] and SAA[N+2]. In other embodiments, the communication of the pointing device 100 and the external device 10 might be interfered to be disconnected temporarily. Accordingly, the interpolation angle generator 308 of the processor 130 can generate a plurality of interpolation attitude angle outputs IAA through the technology of interpolation (for example, Bezier curve), so as to perform the interpolation between one set of the second attitude angle output that before the communication outage and another set of the second attitude angle output that after the communication restoration.

In the above embodiments, the processor 130 first performs the interpolation, then converts the output data (for example, the second attitude angle output SAA or the interpolation attitude angle output IAA) into the displacement data PO by the attitude angle convertor 307. In other embodiments, the processor 130 first converts the output data (for example, the second attitude angle output SAA) into the displacement data PO by the attitude angle convertor 307, then performs the interpolation for the displacement data PO. Therefore, the interpolation attitude angle output IAA would not be generated. In particular, the attitude angle convertor 307 converts the previous set of the second attitude angle output SAA[N] and the next set of the second attitude angle output SAA[N+2] as shown in FIG. 7 into the previous set of the displacement data PO[N] and the next set of the displacement data PO[N+2]. Then, the interpolation angle generator 308 can generate an interpolation displacement data sequenced between the previous set of the displacement data PO[N] and the next set of the displacement data PO[N+2] by the technology of interpolation (for example, Bezier curve, Isaac Newton, or Lagrange).

In sum, by choosing one of the first attitude angle output FAA and the second attitude angle output SAA to perform the calculation of the displacement data, the pointing device 100 and the control method 200 of the present disclosure can avoid from the problems caused by the heavy calculation burden of the processor 130 (for example, over power consumption, long reaction time, high cost).

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:
1. A pointing device, comprising:
an acceleration sensor configured to generate acceleration data according to a motion state of the pointing device;
a motion sensor configured to generate angular velocity data according to the motion state of the pointing device; and
a processor coupled to the acceleration sensor and the motion sensor and comprising a first attitude angle calculator, a second attitude angle calculator, an attitude angle selector and an attitude angle convertor,
wherein when the pointing device is first turned on and the attitude angle selector has never received a first attitude angle output or a second attitude angle output, the acceleration sensor generates the acceleration data, and the first attitude angle calculator calculates the first attitude angle output according to the acceleration data, so that the attitude angle selector receives the first attitude angle output as a first reference data;
wherein when a predetermined condition is satisfied, the processor controls the acceleration sensor to generate the acceleration data, the first attitude angle calculator calculates the first attitude angle output according to the acceleration data, and the attitude angle selector receives the first attitude angle output as a second reference data, so as to generate an output data,
when the predetermined condition is not satisfied, the attitude angle selector receives the second attitude angle output as a third reference data, so as to generate the output data, wherein the second attitude angle calculator is configured to calculate the second attitude angle output according to the angular velocity data and the first reference data and without using the accelera- tion data, wherein the second attitude angle output comprises a pitch angle, a roll angle and a yaw angle;

wherein the attitude angle convertor is configured to convert the output data into displacement data of a reference coordinate system.

2. The pointing device of claim 1, wherein the predetermined condition is the second attitude angle output being greater than a predetermined value.

3. The pointing device of claim 2, further comprising an interpolation angle generator, wherein when the attitude angle selector receives the N+1 set of the first attitude angle output, the second attitude angle calculator calculates the N+2 set of the second attitude angle output according to the N+2 set of the angular velocity data and the N+1 set of the first attitude angle output, and the interpolation angle generator generates the N+1 set of an interpolation attitude angle output as the output data according to the N set of the second attitude angle output and the N+2 set of the second attitude angle output;

wherein N is the positive integer greater than 1.

4. The pointing device of claim 2, wherein the second attitude angle output being greater than the predetermined value comprises that at least one of the pitch angle, the roll angle and the yaw angle of the second attitude angle output is greater than the predetermined value.

5. The pointing device of claim 1, wherein the predetermined condition is an elapsed time after the attitude angle selector receives the first attitude angle output being equal to or more than a predetermined period.

6. The pointing device of claim 5, further comprising an interpolation angle generator, wherein when the attitude angle selector receives the N+1 set of the first attitude angle output, the second attitude angle calculator calculates the N+2 set of the second attitude angle output according to the N+2 set of the angular velocity data and the N+1 set of the first attitude angle output, and the interpolation angle generator generates the N+1 set of an interpolation attitude angle output as the output data according to the N set of the second attitude angle output and the N+2 set of the second attitude angle output;

wherein N is the positive integer greater than 1.

7. The pointing device of claim 1, further comprising a drift remover, wherein the displacement data of the reference coordinate system comprises a displacement on a first axis, the drift remover selectively outputs the displacement data of the reference coordinate system based on whether the displacement on the first axis is greater than a threshold value.

8. A control method applied to a pointing device, comprising:

when the pointing device is first turned on and a first attitude angle output or a second attitude angle output has never been received, generating acceleration data according to a motion state of the pointing device, and calculating the first attitude angle output as a first reference data according to the acceleration data;

generating angular velocity data according to the motion state of the pointing device;

when a predetermined condition is satisfied, generating the acceleration data, calculating the first attitude angle output as a second reference data according to the acceleration data, so as to generate an output data;

when the predetermined condition is not satisfied, receiving the second attitude angle output as a third reference data, so as to generate the output data, wherein the second attitude angle output is calculated according to the angular velocity data and the first reference data and without using the acceleration data, wherein the second attitude angle output comprises a pitch angle, a roll angle and a yaw angle; and converting the output data into displacement data of a reference coordinate system.

9. The control method of claim 8, wherein the predetermined condition is:

the second attitude angle output being greater than a predetermined value.

10. The control method of claim 9, further comprising:

when the N+1 set of the first attitude angle output is received, calculating the N+2 set of the second attitude angle output according to the N+2 set of the angular velocity data and the N+1 set of the first attitude angle output; and generating the N+1 set of an interpolation attitude angle output as the output data according to the N set of the second attitude angle output and the N+2 set of the second attitude angle output;

wherein N is the positive integer greater than 1.

11. The control method of claim 9, wherein the second attitude angle output being greater than the predetermined value comprises that at least one of the pitch angle, the roll angle and the yaw angle of the second attitude angle output is greater than the predetermined value.

12. The control method of claim 8, wherein the predetermined condition is:

an elapsed time after the first attitude angle output is received being equal to or more than a predetermined period.

13. The control method of claim 12, further comprising:

when the N+1 set of the first attitude angle output is received, calculating the N+2 set of the second attitude angle output according to the N+2 set of the angular velocity data and the N+1 set of the first attitude angle output; and generating the N+1 set of an interpolation attitude angle output as the output data according to the N set of the second attitude angle output and the N+2 set of the second attitude angle output;

wherein N is the positive integer greater than 1.

14. The control method of claim 8, wherein the displacement data of the reference coordinate system comprises a displacement on a first axis, and the control method further comprises:

selectively outputting the displacement data of the reference coordinate system based on whether the displacement on the first axis is greater than a threshold value.

* * * * *